(12) United States Patent
Lo

(10) Patent No.: US 7,633,684 B1
(45) Date of Patent: Dec. 15, 2009

(54) LENS FOR LIGHT EMITTING DIODES MOUNTED ON A HEAT SINK

(75) Inventor: Chi Wai Lo, Tsuen Wan (HK)

(73) Assignee: Lomak Industrial Company Ltd, Hong Kong (HK)

( * ) Notice: Subject to any disclaimer, the term of this patent is extended or adjusted under 35 U.S.C. 154(b) by 0 days.

(21) Appl. No.: 12/420,352

(22) Filed: Apr. 8, 2009

(51) Int. Cl.
G02B 3/00 (2006.01)
G02B 13/18 (2006.01)

(52) U.S. Cl. .................. 359/651; 359/662; 359/708; 359/718; 359/720; 359/724; 359/737; 359/743

(58) Field of Classification Search ............ 359/651, 359/662, 708, 718, 720, 724, 737, 743
See application file for complete search history.

(56) References Cited

U.S. PATENT DOCUMENTS

| | | | | |
|---|---|---|---|---|
| 4,099,848 A | * | 7/1978 | Osakabe | 359/718 |
| 4,963,008 A | * | 10/1990 | Fujimura | 359/743 |
| 5,966,250 A | * | 10/1999 | Shimizu | 359/727 |
| 5,995,303 A | * | 11/1999 | Honguh et al. | 359/708 |
| 6,970,291 B2 | * | 11/2005 | Kamon | 359/569 |
| 2007/0273983 A1 | * | 11/2007 | Hebert | 359/708 |
| 2009/0032595 A1 | * | 2/2009 | Oliva et al. | 359/708 |

* cited by examiner

*Primary Examiner*—Evelyn A. Lester
(74) *Attorney, Agent, or Firm*—James A. Italia; Italia IP

(57) ABSTRACT

A lens particularly suited to elongated grooved lens holders such as heat sinks for light emitting diodes. The lens may have a curved surface which projects light in rectangular beams and a radial flange for engaging grooves of a grooved lens holder. Curvature is that of a flattened or compressed sine wave, with less than one full wave being formed along the lens. In one aspect of the invention, the crest of the wave, which would ordinarily be domed, may be flat. The radial flange has straight sides to enable contiguity when arrayed in abutment as well as for cooperating with the grooves of the lens holder.

14 Claims, 5 Drawing Sheets

| 50A | 50B | 50C |
|---|---|---|
| 50D | 50E | 50F |

LENS FOR LIGHT EMITTING DIODES MOUNTED ON A HEAT SINK

CROSS-REFERENCE TO RELATED APPLICATIONS

This application claims the benefit of the filing date under 35 USC 119(a) of Chinese Patent Application No. 200820203218.7, filed Nov. 11, 2008, the contents of which are incorporated herein by reference. This application is also related to Patent Applications entitled MODULAR LED FLOOD LIGHT and HEAT SINK FOR MODULAR LED FLOOD LIGHT, both of common ownership with the present invention, and filed of even date herewith.

FIELD OF THE INVENTION

The present invention relates to illumination, and more particularly to lens configuration for lenses intended to be mounted to a heat sink which supports light emitting diodes within a luminaire.

BACKGROUND OF THE INVENTION

Lights for illuminating large areas such as roads, parking lots, fields, and the like have long been provided. Lighting technology for such lights has progressed from incandescent to specialized high powered types such as sodium vapor and mercury vapor. However, it has become desirable to utilize more efficient light sources, as efficiency relates to units of light output per unit of electrical input.

Light emitting diodes (hereinafter LEDs) are among the most efficient types of light sources commercially available today. LEDs enjoy not only relatively high efficiency, but offer long life and relatively uncomplicated construction. LEDs have progressed to the point where white light producing LEDs could be employed in many applications, including overhead or elevated lighting such as that suitable for roads, parking lots, fields, and the like.

LEDs require suitable heat sinks to dissipate heat generated by the LEDs. Heat sinks are advantageously fabricated by extruding them from aluminum or an aluminum alloy. It would be desirable to provide lenses for LEDs which are formed to accommodate extruded heat sinks.

It would also be desirable to provide lenses which project light in rectangular beams, when the beam is viewed in cross section. This promotes more even lighting than is provided by circular beams. When plural circular beams impinge upon an environmental surface, there are gaps in coverage where between the circular light patches. Alternatively, where circular beams overlap, there are areas where only one beam contributes its light, so that lighting is still uneven. There exists a need for a lens which projects rectangular beams, particularly for lens holders such as heat sinks, and also for serial arrangements of light sources and lenses.

SUMMARY OF THE INVENTION

The present invention satisfies the above stated needs in a lens intended for use with heat sink mounted LEDs, and advantageously, for overhead or elevated luminaries such as those used to illuminate roads, parking lots, fields, and the like. Despite the various purposes, such lights will be referred to as street lights for brevity.

The novel lens is configured to project light as beams which are rectangular in cross section, from a point source such as an LED located proximate the novel lens. To this end, the novel lens may have an undulating exterior or exposed surface, the undulation defining a very shallow sine wave when viewed in side elevation. A half sine wave shaped dome may occupy each square area formed by the novel lens. Where the lens is configured as a non-square rectangle, such as where in plan the lens is viewed as two abutting squares, two half sine wave domes are formed in one orthogonal axis. According to another aspect of the invention, each dome may have a flat uppermost or exposed surface at the center. In one orthogonal axis, the lens is bounded by a partial or truncated dome.

The novel lens may be configured to be arranged in rows, with each lens cooperating closely with its neighbors so that no gaps appear between adjacent lenses, as occurs between circles which have been placed in non-overlapping abutment. This comes into play where the lenses are grouped in abutment with each other, such as in a closely spaced line.

The novel lens may have lateral flanges for engaging grooves formed in heat sinks or other supporting structure.

It is therefore one object of the invention to provide a lens which projects rectangular beams of light from a point light source.

Another object of the invention is to provide a lens which cooperates with extruded lens holders such as heat sinks.

It is an object of the invention to provide improved elements and arrangements thereof by apparatus for the purposes described which is inexpensive, dependable, and fully effective in accomplishing its intended purposes.

These and other objects of the present invention will become readily apparent upon further review of the following specification and drawings.

BRIEF DESCRIPTION OF THE DRAWINGS

Various objects, features, and attendant advantages of the present invention will become more fully appreciated as the same becomes better understood when considered in conjunction with the accompanying drawings, in which like reference characters designate the same or similar parts throughout the several views, and wherein.

DETAILED DESCRIPTION

Figure 1:
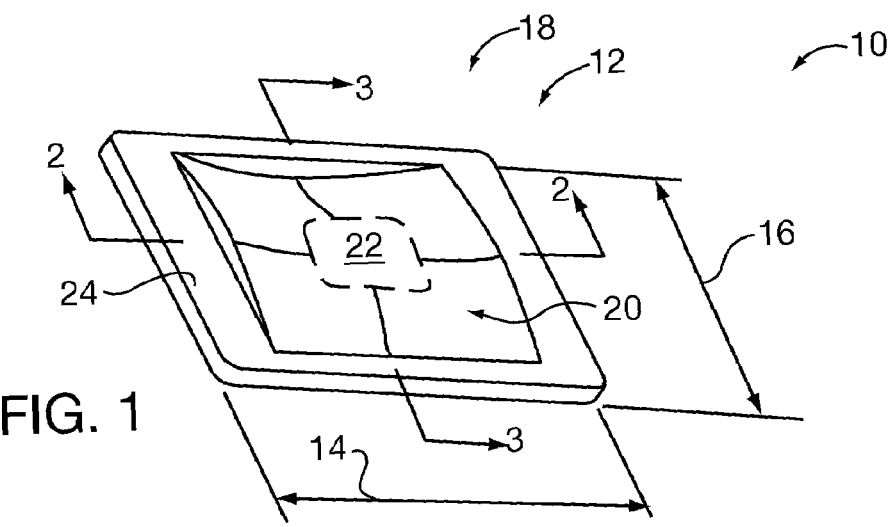
FIG. 1 is a perspective view of a lens according to at least one aspect of the invention.
Figure 2:
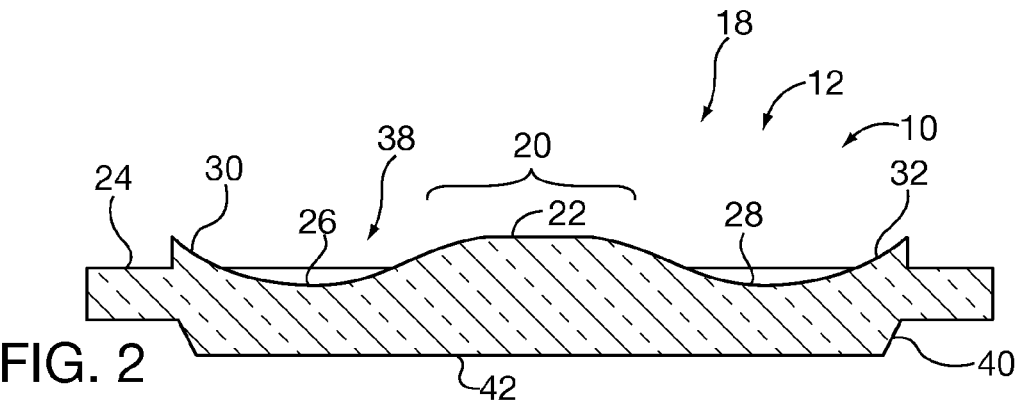
FIG. 2 is a cross sectional view taken along line 2-2 of FIG. 1.

FIG. 1 of the drawings shows a lens 10 for projecting light in beams which are rectangular when viewed in cross section, using a point light source (described hereinafter). The lens 10 may comprise a body 12 having a length 14, a width 16, and depth or thickness in a third orthogonal direction. The body 12 has a curved top surface 18 extending along the length 14 and width 16 of the body 12. Also, referring to FIG. 2, the curved top surface 18 may have configuration of a truncated flattened sine wave when viewed in cross section from a first direction and of a complementing truncated flattened sine wave when viewed in cross section from a perpendicular second direction. As employed herein, the term "flattened sine wave" refers to the graphic effect on the resultant wave of compression of the vertical axis (along the direction of the thickness, as depicted in FIG. 2) relative to the horizontal axis (along the direction of the length 14 or of the width 16). The first direction may be that parallel to the length 14, with the second direction being that which is parallel to the width 16, for example.

Curvature in the two directions results the curved top surface 18 having a central domed portion 20 (best seen in FIG. 2), which central domed portion 20 has a flat facet 22 at the center thereof. Flattening of the flat facet 22 should not be confused with flattening or compression of the sine wave which is employed herein to characterize curvature of the top surface 18.

In a true sine wave or even a sine wave wherein the vertical axis is compressed, the top of the wave would be curved. Therefore, for the lens 10, the term "sine wave" is provided as a semantic convenience in conveying the overall effect seen in side view, apart from the flat facet 22, and should not be literally construed.

The body 12 may comprise a radial flange 24 extending outwardly therefrom in the direction of the length 14 and also in the length of the width 16. Of course, the radial flange 24 may extend outwardly in only one direction, if desired for a particular application.

FIG. 2 shows the lens 10 and the sine wave curvature of the top surface 18 in the length direction. The wave is seen to be declining from the leftmost point as depicted in FIG. 2 towards the right to form a first trough 26. The central domed portion 20 rises to the right of the trough 26. The wave again declines to the right of the central domed portion 20 to define a second trough 28. The first trough 26 terminates at the radial flange 24 at an inclined surface 30. Similarly, the second trough 28 terminates at the radial flange 24 at a corresponding but generally mirror image inclined surface 32. The lowest points of the troughs 26 and 28 are located below the upper surface 38 of the radial flange 24.

It should be noted at this point that orientational terms such as upper, lower, uppermost, right, left, and others refer to the drawing as viewed by an observer. It will be understood that these orientational terms do not connote that any particular orientation of the invention assume criticality in defining the invention. Therefore, orientational terms must be understood to provide semantic basis for purposes of description, and do not limit the invention or its component parts in any particular way.

Curvature from the inclined surface 30 to the inclined surface 32 represents the entirety of the sine wave which is present on the lens 10 in that there is only one iteration of the sine wave formed on the body 12 in each of the directions of the length 14 and of the width 16.

Figure 3:
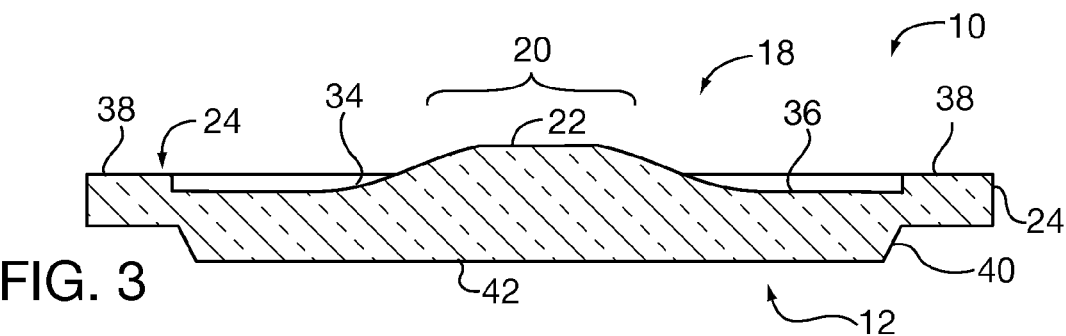
FIG. 3 is a cross sectional view taken along line 3-3 of FIG. 1.

FIG. 3 shows sine wave curvature of the top surface 18 in the width direction. In this direction, curvature forms opposed slopes 34, 36 which at their lowest points are below the upper surface 38 of the radial flange 24. Another way of saying that portions of the sine wave in both of the orthogonal directions are below the upper surface 38 is to say that curvature of the curved top surface 18 extends in the direction of thickness below the radial flange 24. Similarly, it may be said that part of the curved top surface 18 extends above the radial flange in the direction of thickness.

FIG. 3 also shows that the body 18 extends beyond the radial flange 24 in the direction thickness on both of two opposed sides of the radial flange 24. Notably, the body 12 further comprises a base portion 40 which extends below the radial flange 24. This base portion may comprise a flat bottom surface 42. A corresponding flat bottom surface (not shown) may be provided in the absence of the extending base portion 40.

Figure 4:
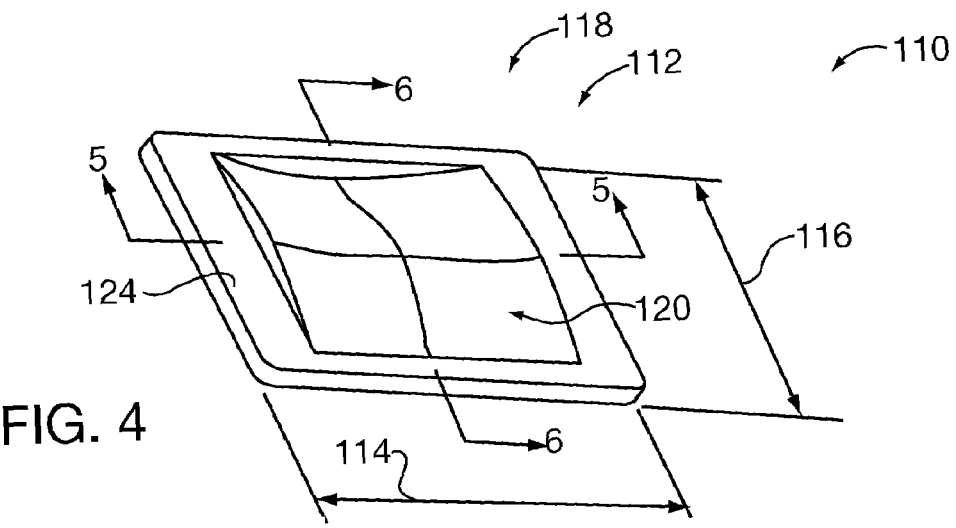
FIG. 4 is a perspective view of a lens according to another aspect of the invention.
Figure 5:
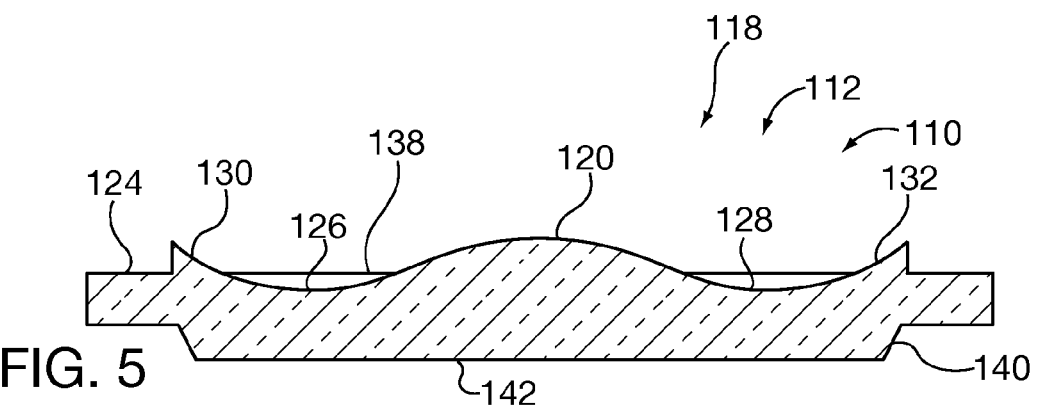
FIG. 5 is a cross sectional view taken along line 5-5 of FIG. 4.
Figure 6:
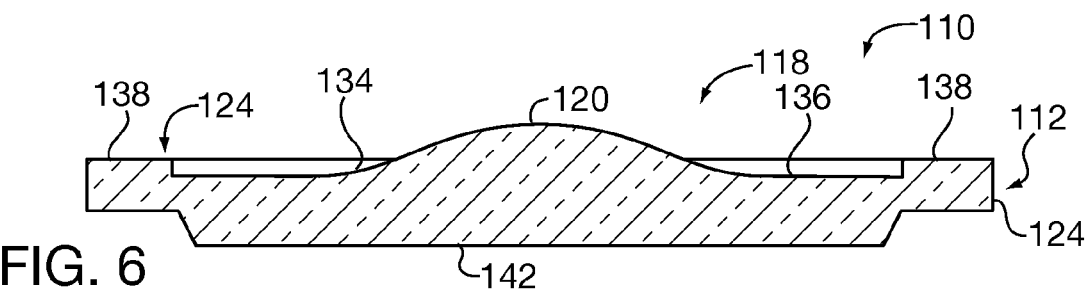
FIG. 6 is a cross sectional view taken along line 6-6 of FIG. 4.

FIG. 4 shows a lens 110 which differs from the lens 10 in that the former does not have the flat facet 22. Rather, a central domed portion 120, which corresponds to the central domed portion 20 of the lens 10, is truly domed as it displays curvature continuously therealong, despite compression of the vertical axis of curvature. In other ways, the lens 110 may be the structural counterpart of the lens 10, the former having a body 112 having a length 114, a width 116, and depth or thickness in a third orthogonal direction. The body 112 has a curved top surface 118 extending along the length 114 and width 116 of the body 112, a central domed portion 120, a radial flange 124 extending outwardly from the body 112, a first trough 126, a second trough 128, inclined surfaces 130 and 132, and a base portion 140 which may comprise a flat bottom surface 142. The components of lens 110, with the exception of the central domed portion 120, may be structurally identical to those of their similarly named counterparts of the lens 10. These components are shown in FIGS. 4-6.

The flat facet 22 of the lens 10, which flat facet 22 is absent in the lens 110, modifies the pattern of light projection from that of the lens 110.

Figure 7:
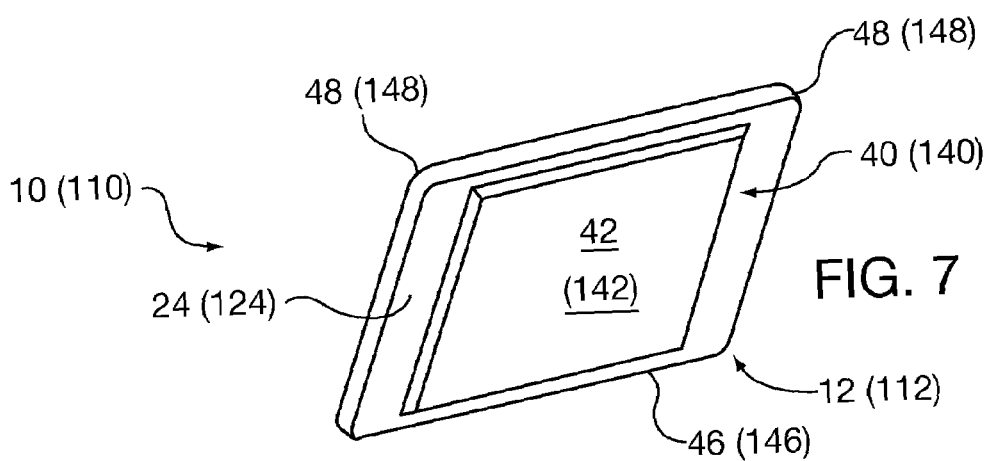
FIG. 7 is a bottom perspective view that would apply to both FIGS. 1 and 4.

FIG. 7 shows a perspective view of a possible appearance of the bottoms of both lenses 10 and 110. It is seen that the body 12 (or the body 112) has a generally rectangular perimetric boundary 46 (146) having rounded corners 48 (148).

Figures 8, 9:
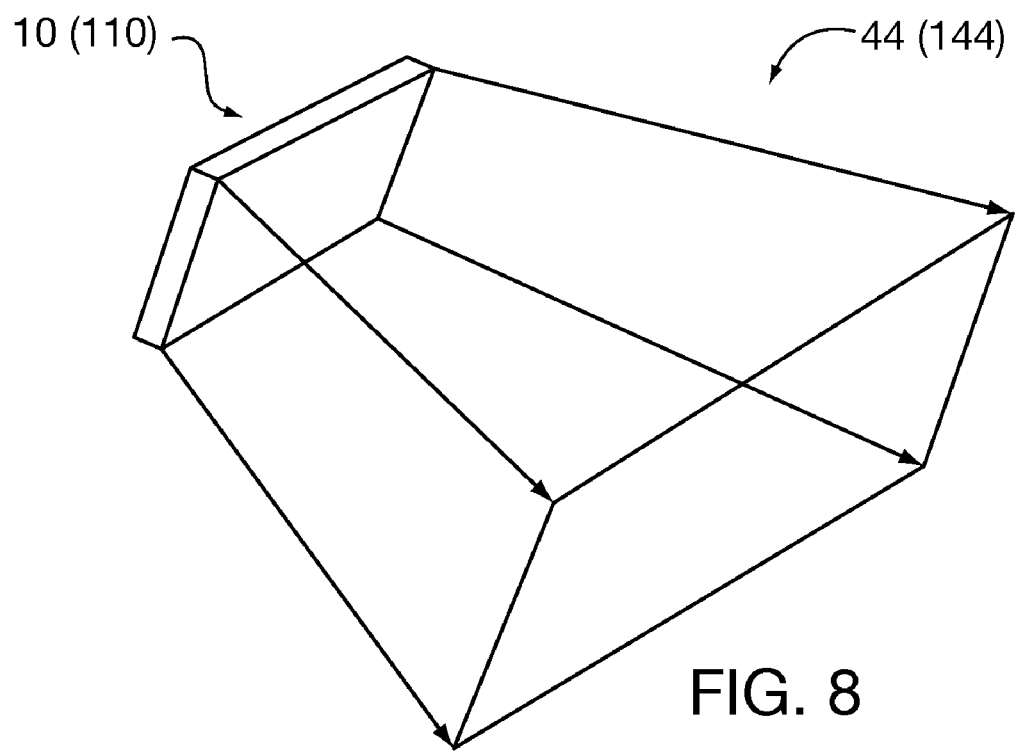
FIG. 8 is a diagrammatic representation illustrating light projection from the lens of FIG. 1 or that of FIG. 4.
FIG. 9 is a diagrammatic representation illustrating light projection from a plurality of lenses which may be those of FIG. 1 or those of FIG. 4.

FIG. 8 shows a characteristic of both lenses 10 and 110. Notably, both lenses 10, 110 are configured to project light in a beam 44 (or, for lens 110, a beam 144) which is rectangular in cross section. This is shown diagrammatically in FIG. 8, it being understood that due to the presence of the flat facet 22 in the lens 10 but not in the lens 110, the actual projected beams 44, 144 will differ somewhat.

FIG. 9 illustrates an optical effect which can be obtained using the lens 10 or the lens 110. Plural lenses 10 or 110 may be focused to project rectangular patches of light 50A, 50B, 50C, 50D, 50E, 50F which abut one another. It will be appreciated that because the rectangular patches 50A, 50B, 50C, 50D, 50E, 50F provide abutting straight lines where they abut, there are no gaps in illumination, or alternatively, doubly covered areas beside singly covered areas. By contrast, it would be impossible to achieve this effect with circular beams (not shown), as are frequently provided by luminaries generally, or by light beams (not shown) that have curved if not circular outer boundaries. Thus the novel lenses 10, 110 may contribute to even illumination of environmental surfaces.

Figure 11:
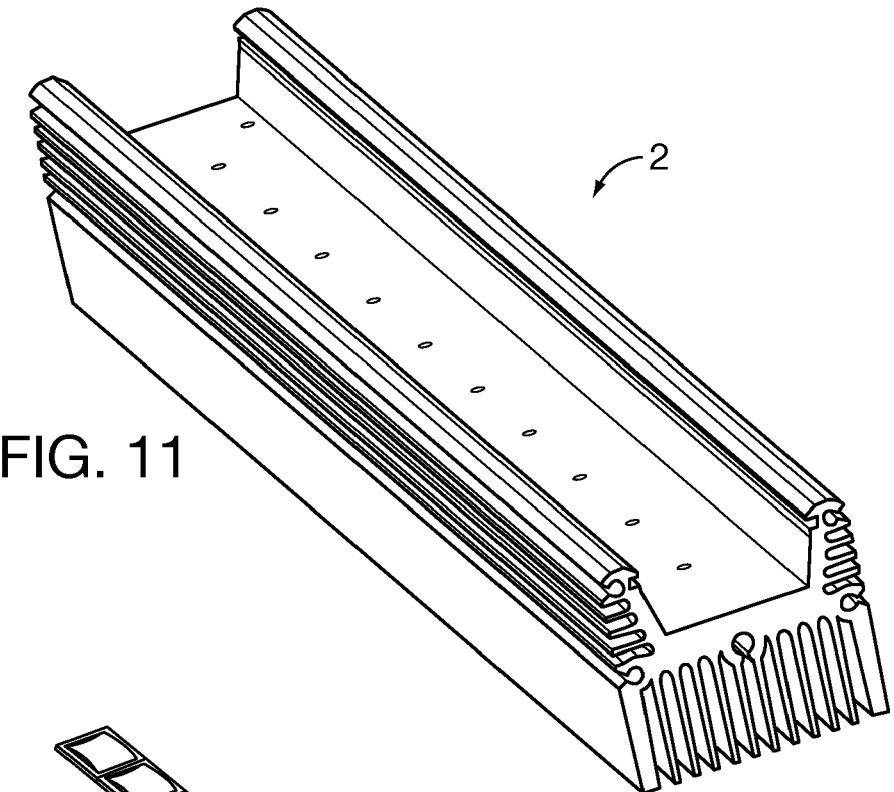
FIG. 11 is a perspective detail view of a heat sink shown in FIG. 10.
Figure 10:
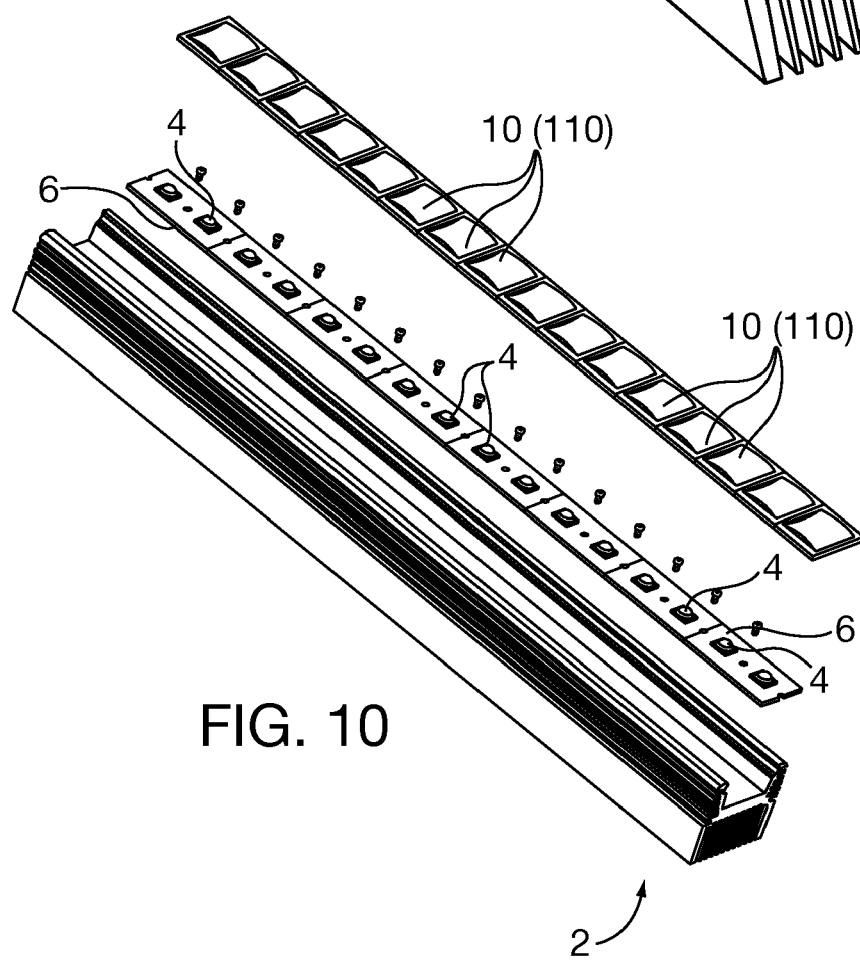
FIG. 10 is an exploded perspective view of a heat sink assembly with which the lens of FIG. 1 or that of FIG. 4 may cooperate.
Figure 12:
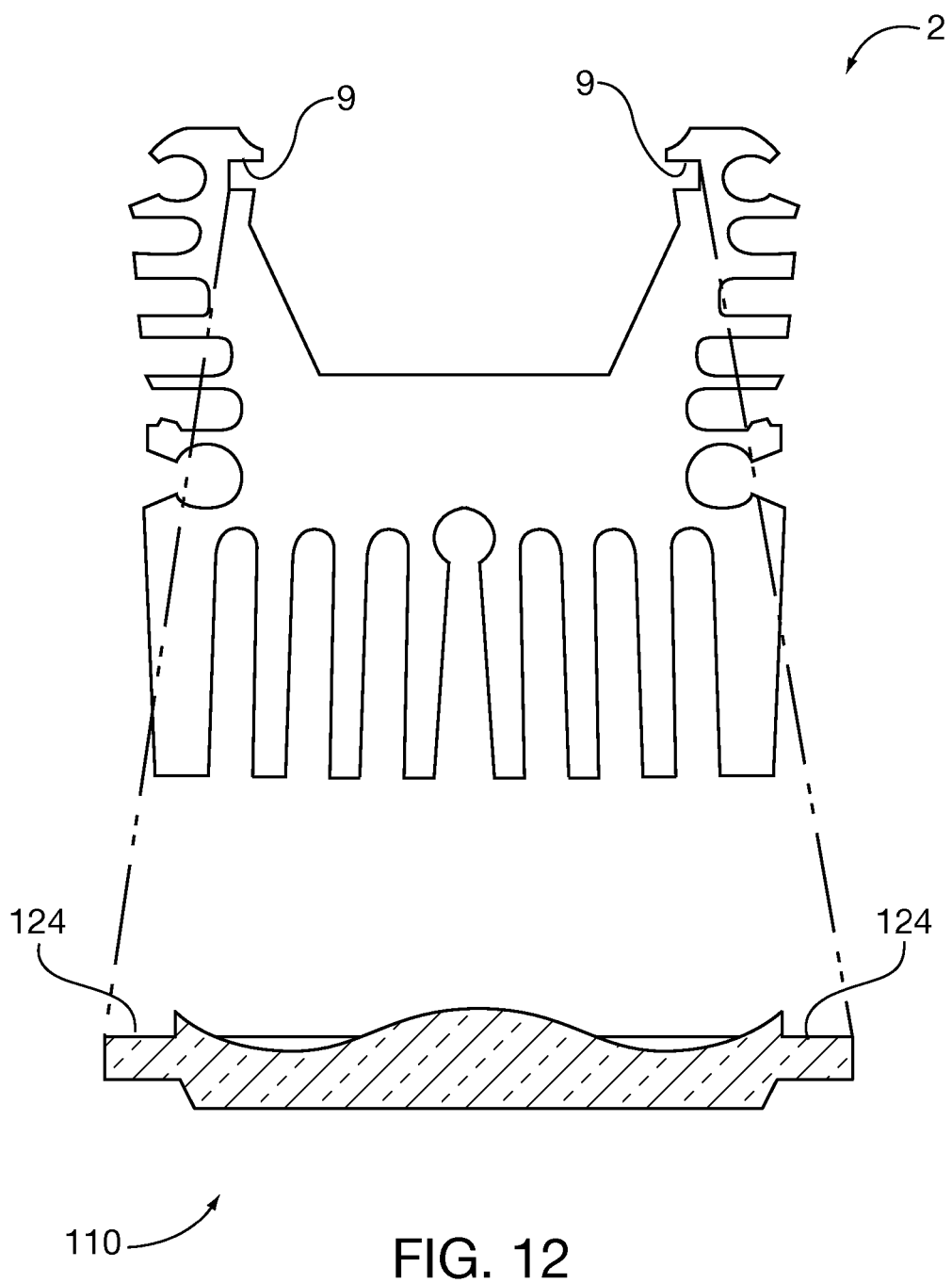
FIG. 12 is an end view of the heat sink of FIG. 11, shown proximate the lens of FIG. 4.

FIG. 10 shows a heat sink assembly comprising a heat sink 2, a plurality of LEDs 4 which are mounted on printed circuit boards 6, and a plurality of lenses 10 (110) which may be mounted to the heat sink assembly 2. It will be seen in FIG. 10 that with the LEDs 4 mounted in a straight row, the lenses 10, 110 should be similarly arrayed in abutment. Because of the straight lines of the rectangular perimetric boundary 46 (146) (see FIG. 7), a compact formation of the lenses 10 (110) ensues, with no gaps visible between adjacent lenses 10 (110). The straight sides of the perimetric boundary 46 (146) also assure cooperation with grooves 9 of the heat sink 2 in which the lenses 10 (110) are received and supported. These grooves 9 are more clearly seen in FIG. 11. FIG. 12 still better shows cooperation of the grooves 9 and the lens 110 as the radial flange 124 fits to the grooves 9. Of course, the lens 10 would cooperate equally given that the only difference between the lens 10 and the lens 110 is the flat facet 22, which does not come into play as to insertion of a lens 10 or 110 within the heat sink 2.

The present invention is susceptible to modifications and variations which may be introduced thereto without departing from the inventive concepts. For example, although the inventive lenses 10, 110 have been indicated as being of glass, it would be possible to fabricate them from a suitable synthetic resin, such as acrylic plastic among others.

While the present invention has been described in connection with what is considered the most practical and preferred embodiment, it is to be understood that the present invention is not to be limited to the disclosed arrangements, but is intended to cover various arrangements which are included within the spirit and scope of the broadest possible interpretation of the appended claims so as to encompass all modifications and equivalent arrangements which are possible.

I claim:

1. A lens for projecting light in beams which are rectangular when viewed in cross section, using a point light source, comprising a body having length, width, and depth, and further comprising a curved top surface extending along the length and width of the body, wherein the curved top surface has configuration of a truncated flattened sine wave when viewed in cross section from a first direction and a complementing truncated flattened sine wave when viewed in cross section from a perpendicular second direction.

2. The lens of claim 1, wherein there is only one iteration of the truncated sine wave in the first direction and only one iteration of the truncated sine wave in the second direction.

3. The lens of claim 1, wherein the body further comprises a radial flange extending outwardly therefrom in the length direction.

4. The lens of claim 1, wherein the body further comprises a radial flange extending outwardly therefrom in the width direction.

5. The lens of claim 1, wherein the body further comprises a radial flange extending outwardly therefrom in both the length and the width directions.

6. The lens of claim 5, wherein the body extends beyond the radial flange in the direction thickness on both of two opposed sides of the radial flange.

7. The lens of claim 5, wherein part of the curved top surface extends above the radial flange in the direction of thickness.

8. The lens of claim 5, wherein part of the curved top surface extends below the radial flange in the direction of thickness.

9. The lens of claim 5, wherein part of the curved top surface extends above the radial flange in the direction of thickness and part of the curved top surface extends below the radial flange in the direction of thickness.

10. The lens of claim 5, wherein the top surface is configured to project light in a beam which is rectangular in cross section.

11. The lens of claim 1, wherein the body further comprises a flat bottom surface.

12. The lens of claim 5, wherein the body further comprises a base portion which extends below the flange, and the base portion further comprises a flat bottom surface.

13. The lens of claim 1, wherein the curved top surface has a central domed portion, and the central domed portion has a flat facet at the center thereof.

14. The lens of claim 1, wherein the body has a generally rectangular perimetric boundary having rounded corners.

* * * * *